US006984314B2

(12) United States Patent
Etienne et al.

(10) Patent No.: US 6,984,314 B2
(45) Date of Patent: Jan. 10, 2006

(54) METHOD FOR BIOLOGICAL PURIFICATION OF EFFLUENTS USING BIOFILM SUPPORTING PARTICLES

(75) Inventors: Paul Etienne, Montclar de Lauragais (FR); Pierre Buffiere, Paris (FR)

(73) Assignee: Ondeo Degremont, Rueil Malmaison (FR)

( * ) Notice: Subject to any disclaimer, the term of this patent is extended or adjusted under 35 U.S.C. 154(b) by 0 days.

(21) Appl. No.: 10/469,038

(22) PCT Filed: Feb. 15, 2002

(86) PCT No.: PCT/FR02/00601

§ 371 (c)(1), (2), (4) Date: Aug. 26, 2003

(87) PCT Pub. No.: WO02/068344

PCT Pub. Date: Sep. 6, 2002

(65) Prior Publication Data

US 2004/0084368 A1 May 6, 2004

(30) Foreign Application Priority Data

Feb. 27, 2001 (FR) .................................. 01 02657

(51) Int. Cl.
*C02F 3/02* (2006.01)

(52) U.S. Cl. ...................................... 210/151; 210/616

(58) Field of Classification Search ................ 210/150, 210/151, 605, 616, 617, 618, 903
See application file for complete search history.

(56) References Cited

U.S. PATENT DOCUMENTS

| | | | | | |
|---|---|---|---|---|---|
| 3,764,525 | A | * | 10/1973 | Goodman et al. | 210/615 |
| 3,957,931 | A | * | 5/1976 | Ellis et al. | 210/150 |
| 4,041,113 | A | * | 8/1977 | McKeown | 210/150 |
| 4,482,458 | A | * | 11/1984 | Rovel et al. | 210/617 |
| 4,566,971 | A | * | 1/1986 | Reimann et al. | 210/616 |
| 4,681,685 | A | * | 7/1987 | Sutton et al. | 210/618 |
| 4,762,612 | A | * | 8/1988 | Yoda et al. | 210/150 |
| 5,061,368 | A | | 10/1991 | Tada et al. | |
| 5,160,705 | A | | 11/1992 | Savall et al. | |
| 5,198,105 | A | | 3/1993 | Kauling et al. | |
| 5,543,039 | A | | 8/1996 | Odegaard | |
| 5,578,202 | A | * | 11/1996 | Hirane | 210/150 |
| 5,741,417 | A | * | 4/1998 | Patzig et al. | 210/605 |
| 6,007,712 | A | * | 12/1999 | Tanaka et al. | 210/151 |
| 6,077,424 | A | * | 6/2000 | Katsukura et al. | 210/151 |
| 6,126,829 | A | * | 10/2000 | Gunnarsson et al. | 210/616 |

FOREIGN PATENT DOCUMENTS

| | | |
|---|---|---|
| EP | 1 065 173 A1 | 1/2001 |
| WO | WO-98/32703 | 7/1998 |

* cited by examiner

*Primary Examiner*—Christopher Upton
(74) *Attorney, Agent, or Firm*—Connolly Bove Lodge & Hutz LLP

(57) ABSTRACT

The invention concerns a method for biological purification of effluents in mixed cultures using micro-organisms whereof part at least is fixed on solid supports. The invention is characterized in that said supports are activated so as to generate a turbulence in the reaction medium, the intensity of which is such that it reduces the production of biological sludge, the materials constituting said micro-organism supports being abraded and cleaned, while being retained in said reaction medium.

1 Claim, 6 Drawing Sheets

METHOD FOR BIOLOGICAL PURIFICATION OF EFFLUENTS USING BIOFILM SUPPORTING PARTICLES

FIELD OF THE INVENTION

The present invention relates to a method for the biological purification of wastewater employing a hybrid culture system using biofilm support particles. It also relates to a reactor or equipment for implementing such a method.

BACKGROUND OF THE INVENTION

It is known that the purification of municipal and industrial wastewater is often carried out biologically. In recent decades, processes have passed from those using free microorganism cultures to processes with cultures fixed on specific growth media for the purpose of reducing the size of purification plants.

Fixed cultures are employed either as a fixed bed, that is to say a microorganism growth medium is stationary in the reactor, or as a moving bed, in which case the support materials are small elements that can move freely in the zone of contact with the polluted water. These support elements may be moved either by mechanical stirring or by injecting a liquid, or else by injecting a gas, especially air (this air possibly being, for example, the air needed for the microorganisms to operate when they are aerobic).

The creation and maintenance of a certain level of turbulence in the reaction medium are useable for continuously abrading and cleaning the support material for the microorganisms, this turbulence furthermore making it possible to limit the accumulation of fixed biological sludge. Such turbulence may be created, for example, by the intensity of the gas injected into the medium. Reference may be made in this regard to EP-A-0 549 443.

If it is desired to treat the pollution due to carbon and to nitrogen simultaneously, it is possible to find advantageous solutions given that the materials serve as growth medium for a certain nitrifying biomass, the growth of which is much higher than that in the absence of these materials (see EP-A-0 549 443): these are referred to as hybrid cultures.

However, these known systems have a number of drawbacks. Thus, in the method described above, the production of biological sludge is tied to the normal growth metabolism of the bacteria decontaminating the water. Furthermore, the growth medium materials used are held in place in the reaction chamber either by a retention screen (that lets water through, but not the support material) or by means of a specific separation system. The major drawback of screens is their clogging.

BRIEF SUMMARY OF THE INVENTION

Starting with these known systems, the objective of the present invention was to solve the following two technical problems:

- prevent clogging of the retention screens positioned at the outlet for the treated water;
- reduce the amount of sludge produced, compared with the amount of sludge produced by conventional methods carrying out the same biological purification.

These technical problems are solved by a method for the biological purification of wastewater in hybrid cultures employing microorganisms, at least some of which are fixed to solid support elements, characterized in that said support elements are set in motion so as to generate turbulence in the reaction medium, the intensity of which turbulence is such that it reduces the production of biological sludge, the materials constituting said microorganism support elements being subjected to an abrasion action and to a cleaning action while still being retained in said reaction medium, said materials having a surface texture that includes regions protected from the abrasion, allowing the growth of a biomass providing the biological activity, and abrasive regions.

The desirable level of turbulence so as to obtain the best results in implementing the method according to the invention, as defined above, may be expressed by the energy that is supplied by the aeration and/or stirring means. Preferably, this energy is between 1 and 200 watts per cubic meter of reactor and preferably between 2 and 50 watts per cubic meter of reactor. Such energy levels per cubic meter may be economically viable on account of the compact nature of the reactors employed in the method according to the invention that are defined below.

According to a preferred way of implementing the method defined above, the microorganism support material has one dimension, along any axis, that is between 2 and 50 mm.

As mentioned above, the microorganism support material has a surface texture such that the surface has regions protected from abrasion, allowing the growth of a biomass for providing the biological activity, and abrasive regions making it possible, in the presence of a sufficient level of turbulence (as defined above), to exert friction on the external surfaces of the other particles that are present in the reaction medium.

The subject of the present invention is also a biological reactor for implementing the method defined above, this reactor being characterized in that it includes microorganism support retention means, these means being positioned upstream of the means for removing the liquid effluent leaving, after treatment, said reactor, these retention means comprising:

- a screen inclined to the vertical at an angle of between 0 and 30° approximately and the separation of the bars of which is determined so that it lets the water through but not the microorganism support particles;
- an air injection rail positioned at the base of said screen and operating continuously or intermittently so as to flush the screen; and
- a deflector panel parallel to said screen and located upstream of the latter.

In the foregoing, the term "upstream" is understood to mean with respect to the direction of effluent flow from its entry into the reactor to its discharge therefrom.

Thus by virtue of the invention, the feature consisting in setting the microorganism support particles in motion, for example by injecting a gas or by mechanical stirring or else by a combination of these two means, combined with the feature whereby the constituent material of the microorganism support particles is retained in the reaction medium, while subjecting said material to an abrasion action and to a cleaning action, makes it possible, on the one hand, to reduce clogging of the screens retaining the support material and, on the other hand, to reduce the amount of biological purification sludge normally generated compared with a method producing the same purification, this reduction being around 2 to 50%.

This is because, since the biological reactor in which the method according to the invention is employed includes an inclined screen provided with a deflector and with an air injection rail that purges the surface of the screen, less rapid clogging of the screen is ensured than that observed in the reactor vessels according to the prior art. It has been observed that the flow of support materials close to the screen, with an increased velocity because of the presence of the deflector, helps to detach the solid materials liable to be deposited on said screen, thus making it possible to reduce the rate of clogging.

It has also been observed, surprisingly, that a certain turbulence intensity in the reaction medium allows the production of biological sludge to be reduced. This phenomenon may be explained by the fact that the turbulence within the medium generates friction such that the microorganisms fixed in the form of a biofilm adopt a particular metabolism. This is because a very high abrasion intensity means that certain microorganisms must synthesize substances for increasing the mechanical integrity of the biofilm. When the intensity of the abrasion is high enough so that most of the microorganisms adopt this particular form of metabolism, the growth yield (which is generally defined as being the amount of cells produced relative to the amount of polluting material degraded) decreases considerably. This results in a marked decrease in the amount of sludge produced compared with operation in the absence of turbulence.

According to the present invention, the microorganism support material must have a large surface compared with the volume that it occupies and, preferably, part of this surface must be protected from the turbulence and from collisions, as was explained above. Thus, according to the invention, the surface area of the support material is greater than 100 $m^2$ per cubic meter of material and abrasive excrescences are provided on the external surface of said material. Thanks to the latter feature, internal regions are defined that will be able to be colonized by microorganisms in an amount sufficient to achieve the desired biological purification. The abrasive external surface may be colonized by microorganisms in the form of a biofilm, but the intensity of the stirring and of the turbulence will be such that this biofilm will be in perpetual reconstitution, thereby directing the metabolism of some of the microorganisms that carry out the purification toward a particular form of metabolism and thus limiting the production of biological sludge.

According to the invention, the microorganism support elements preferably have one dimension between 2 mm and 50 mm and the constituent material of said support elements is a plastic obtained, for example, from recycled material, for example polyethylene. Examples of microorganism support particles that can be employed in the method according to the present invention will be described below in greater detail.

The method according to the present invention may be employed in aerobic, anaerobic or anoxic biological treatment modes or in treatment systems operating in a combination of these three modes.

In its application to aerobic purification, the method according to the invention is characterized in that the microorganism support particles are set in motion by injecting air or an inert gas to which oxygen has been added, the amount of said gas being determined so as, on the one hand, to ensure biological purification and, on the other hand, to obtain the necessary turbulence intensity.

In the case of an application to anaerobic purification or anoxic purification, the microorganism support elements are set in motion by the fermentation gas or by a mechanical stirring system.

In its application to a combined carbon/nitrogen treatment involving two steps, an anoxic step and an aerobic step, with recycling of the mixed sludge from the aerobic step to the anoxic step, the method according to the invention may be carried out in one or both of said steps, preferably in the aerobic step so as to immobilize the microorganisms that oxidize the ammoniacal nitrogen. It is also possible to carry out, in the same tank, the anoxic and aerobic steps, the tank then being aerated intermittently and the stirring during the anoxic phase being carried out by another, especially mechanical, means.

Further features and advantages of the present invention will become apparent from the description given below, with reference to the appended drawings that illustrate an example of its implementation that is devoid of any limiting character.

So as to bring out the advantage afforded by the invention as regards reducing the production of sludge, an experimental apparatus described below was used, the results from which will be commented upon later. The means for retaining the microorganism support materials employed in the reactor according to the invention will be described later.

As mentioned above, in order to demonstrate the reduction in biological sludge production provided by the method according to the invention, two strictly identical activated-sludge reactor lines were produced, each reactor being fed with the same wastewater and operating under the same operating conditions. One line constituted the control (it is denoted hereafter by "Control line") containing no floating biomass support material, the other line (called hereafter the "test line") containing a floating growth support material for the biomass, according to the invention.

DETAILED DESCRIPTION OF THE INVENTION

Figure 1:
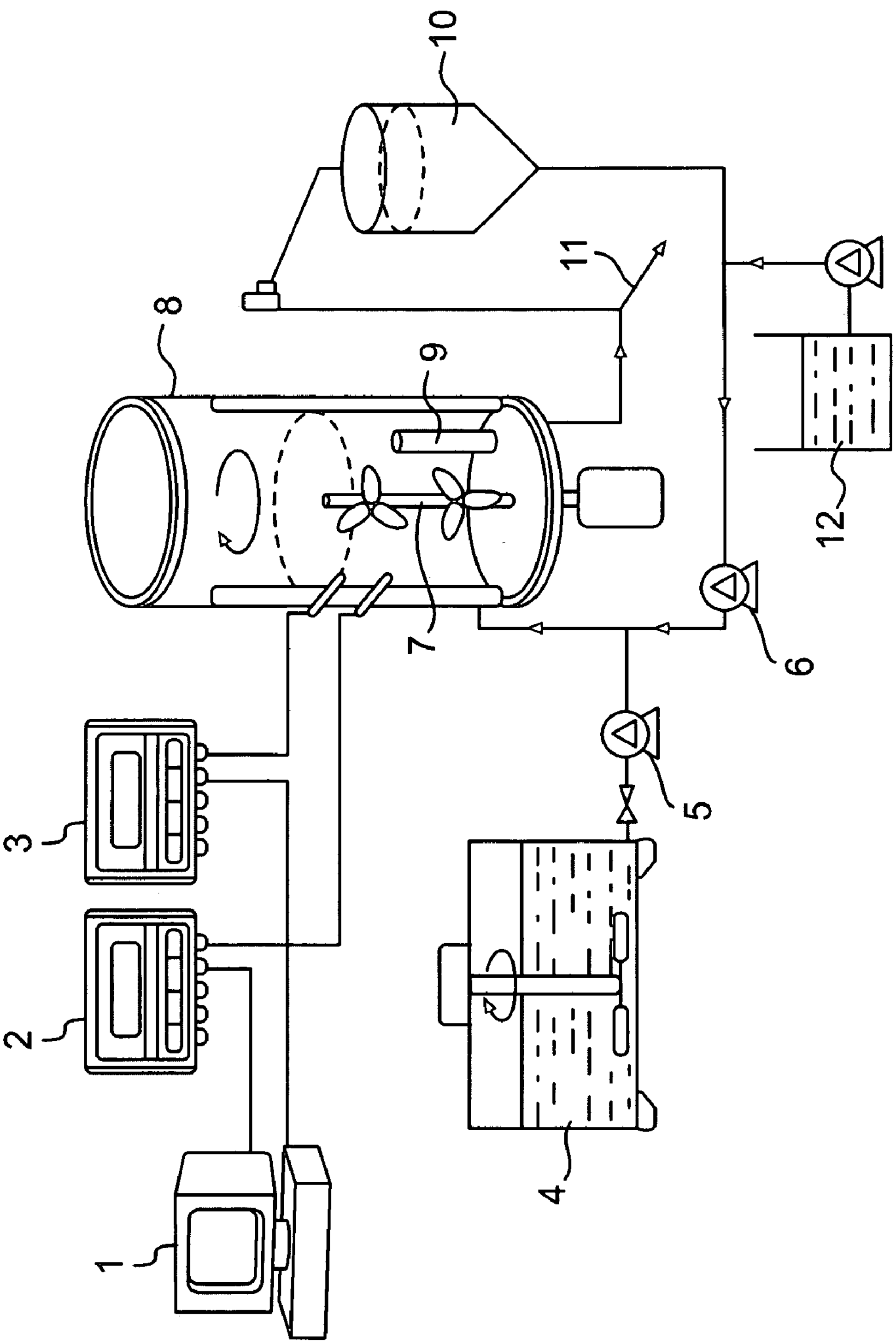
FIG. 1 is a diagram showing the experimental apparatus used for demonstrating the reduction in sludge production thanks to the invention.

FIG. 1 therefore shows each of the experimental lines. Each line comprises a biological reactor 8, a settling tank 10, a pH/temperature probe 3 and an oxygen probe 2. The reactor 8 is fed via a pump 5 from a storage tank 4 for municipal wastewater that has undergone primary settling. Discharge from the reactor takes place via an overflow from a liquid/solid separator 9, to the settling tank 10. The decanted water leaves the plant while some of the sludge is recycled back into the biological reactor 8 by means of a recirculation pump 6. The excess sludge is removed by means of a purge 11. Each line includes a computer 1 for analyzing the results obtained. The biological reactor 8 is stirred by a mechanical stirrer 7 and by aeration, when the latter is in operation.

As regards the biomass support material, the reader may refer to the end of the present description, which gives a few nonlimiting examples thereof.

The Test line operates according to the principle described above.

Table I below indicates the principal characteristics of these two reactor lines.

TABLE I

| Principal parameters of the lines | Values |
|---|---|
| Volume of the reactor (8) | 22 liters |
| Volume of the settling tank (10) | 2 liters |
| Plastic support particles (Test line), made of polyethylene: | |
| density | 935 kg/m$^2$ |
| mean diameter | 3 mm |
| geometry | irregular particles |
| Volume fill factor (Test line) | 20% |
| Mechanical stirrer (7): | 2 marine propellers |
| diameter | 10 cm |

Table II below gives the operating conditions for the Control and Test lines.

TABLE II

| | |
|---|---|
| Nature of the wastewater to be treated | Domestic wastewater, after primary settling, stored at 4° C. and replenished every three days. Easily assimilatable carbon source supplement (acetate, ethanol, propionate, starch) supplied during the anoxic phase |
| Municipal wastewater (MWW): | |
| COD | 350–500 mg/l |
| COD/BOD5 | 1.5 |
| SS | 100–150 mg/l |
| NTK | 60–90 mg/l |
| N—$NH_4$ | 50–75 mg/l |
| Supplement: | |
| COD | Approximately equivalent to the COD of the MWW (therefore synthetic COD = 50% of the total feed COD). It is supplied in the anoxic phase to both lines. |
| Volume load applied | 1 kg COD/m$^3$ · d |
| Mass load applied* | Varied between 0.5 and 1 kg cos/kg VSS.d |
| Sludge age | Varied between 3 and 8 days |
| Controlled temperature | 16° C. ± 1° C. |
| Aerated phase/nonaerated phase alternation: | |
| duration of the phases | 45 min/45 min |
| aeration control | Dissolved oxygen > 3 mg/l |

Control line: the biomass in equilibrium is smaller for the Test line.

The two lines operated with a continuous feed of wastewater and with a flow rate making it possible to obtain a mean applied load of 1 kg of COD per cubic meter of reactor per day.

The biological reactor 8 operated both with aeration and stirring and with only stirring. This mode of operation made it possible to alternate the aerobic phases, ensuring nitrification of the species containing ammonia (denoted by N—$NH_4$ in Table II) present in the wastewater (i.e. their conversion into oxidized species such as nitrites or nitrates), and the anoxic phases for denitrification (i.e. the conversion of the oxidized species into molecular nitrogen).

This mode of operation allowed all of the steps of eliminating the nitrogen contamination to be carried out in the same reactor.

During the aerobic phases, the dissolved oxygen concentration was maintained at above 3 mg/l. During the anoxic phases, a certain amount of organic carbon, taken from an external carbon source 12, was added to the reactor 8 so as to reduce the time needed for the denitrification step.

During the experiment, the sludge age (that is to say the ratio of the total amount of biological sludge contained in the experimental device, the settling tank included, to the amount of biological sludge extracted) varied between 3 and 8 days. This parameter was adjusted by the rate of purge 11 of the biological sludge.

The measurements taken relate to all of the parameters that make it possible to characterize the effects of the contamination entering and leaving the apparatus: total and soluble chemical oxygen demand, ammoniacal nitrogen N—$NH_4$, nitrites and nitrates. The amount of sludge is quantified on the basis of the suspended solids (SS) and of volatile suspended solids (VSS).

The sludge production is calculated as being the sum of sludge extracted by the purge, the amount of sludge leaving in the decanted effluent and the accumulation of sludge in the biological reactor (in free form or in fixed form).

An apparent biomass yield $Y_{obs}$, that is to say the ratio of the amount of sludge produced to the amount of COD removed by the system, was also calculated.

Figure 2A:
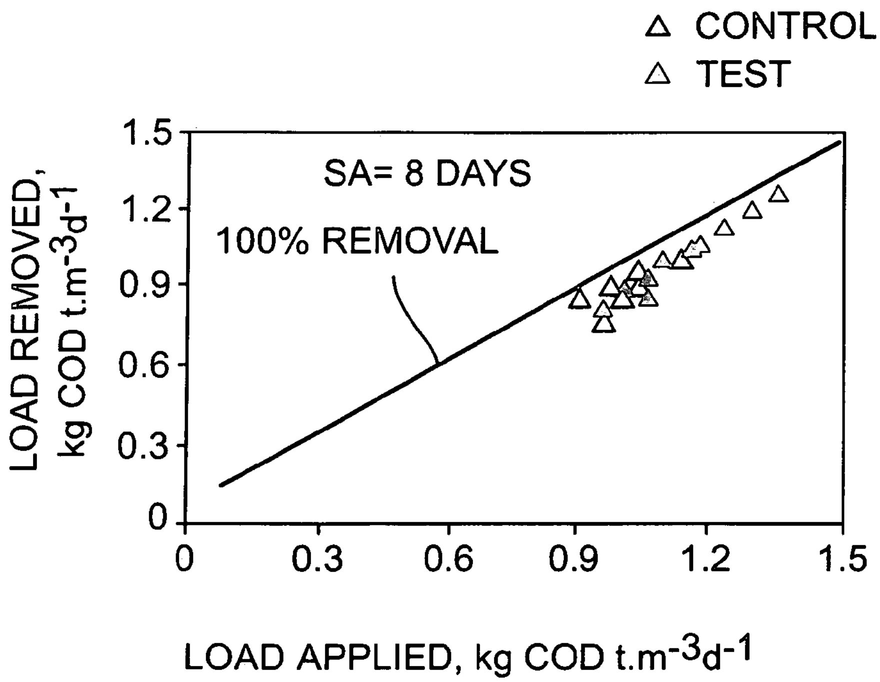
FIGS. 2*a* to 2*c* are curves that demonstrate the results provided by the invention as regards elimination of the COD.
Figure 2B:
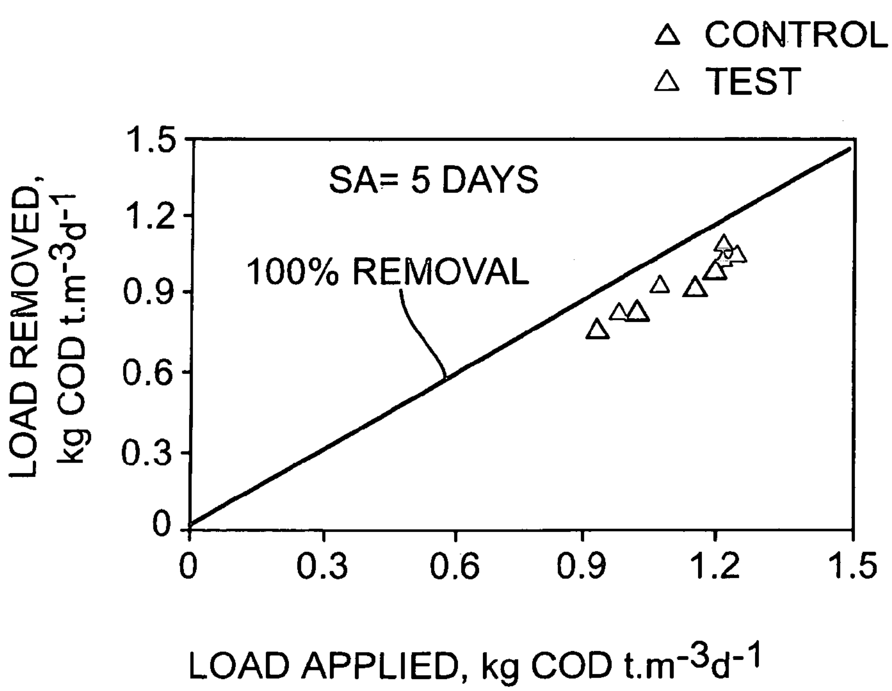
Figure 2C:
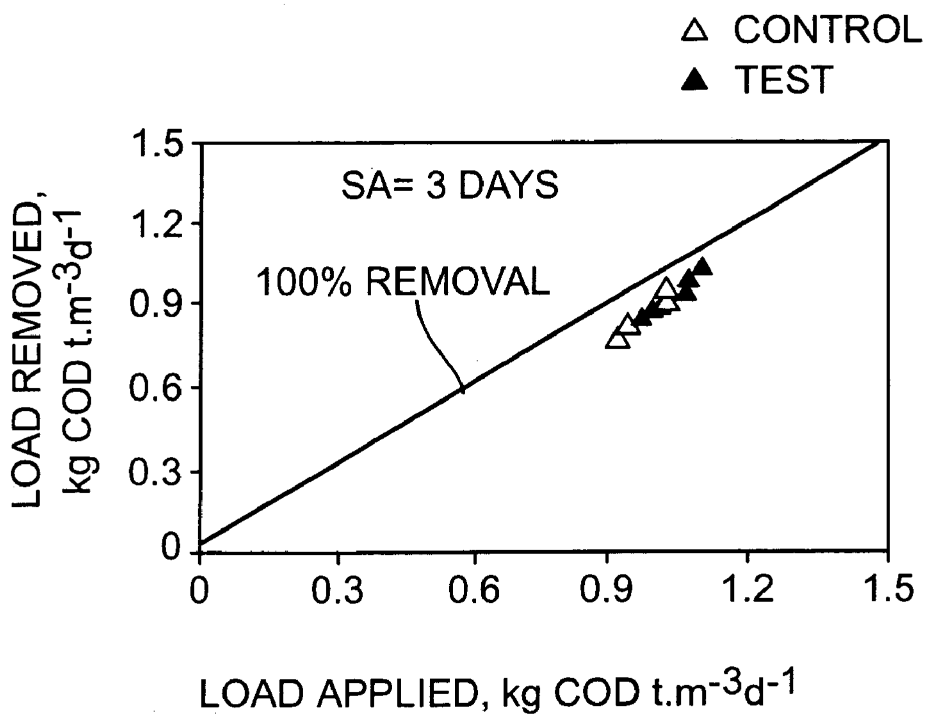

The results obtained are illustrated by FIGS. 2*a* and 2*c*, which show the variation in the load removed as a function of the load applied. These figures show that there are no substantial differences, as regards the amounts of COD removed, between the Control line and the Test line.

Figure 3A:
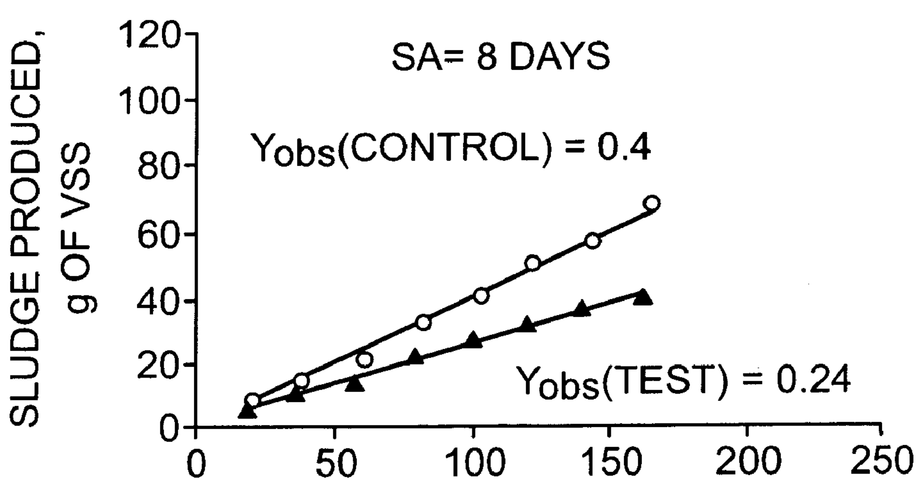
FIGS. 3*a* and 3*b* are curves showing the cumulative amount of sludge produced as a function of the cumulative amount of COD eliminated in each of the two experimental reactor lines used (FIG. 1) and for two different sludge ages.
Figure 3B:
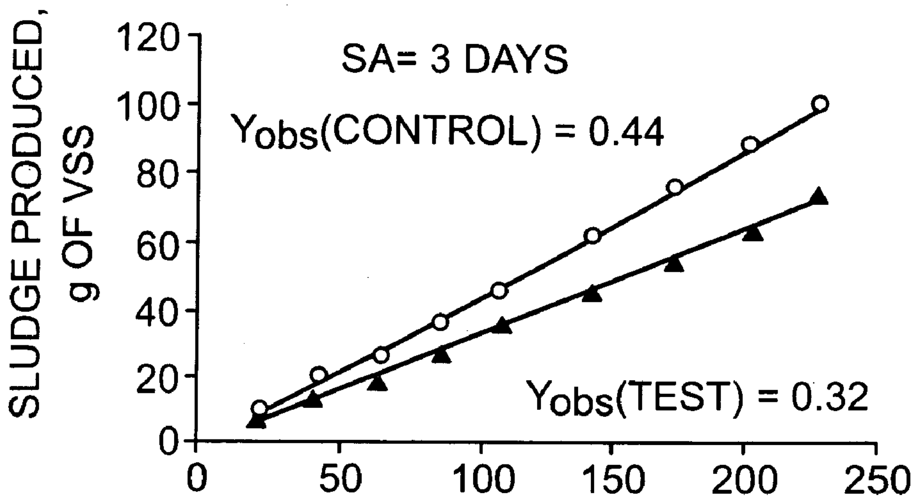

Referring now to FIGS. 3*a* and 3*b*, these show the cumulative amount of sludge produced as a function of the cumulative amount of COD removed, in each of the two lines (the Test line and the Control line) and for two different sludge ages. The curves illustrated by these figures demonstrate that the amount of sludge produced, expressed on the basis of the amount of volatile suspended solids, is lower in the Test line than in the Control line. The slope of each of the curves represents the current biomass yield, allowing the results thus obtained to be compared. It will be seen that, for a sludge age of 8 days, the biomass yield obtained in the Control line is 0.4 kg VSS/kg COD, whereas it is 0.24 kg VSS/kg COD in the Test line. The observed reduction is substantial (around 40%). With a sludge age of three days, the apparent yield is 0.44 for the Control line and 0.32 for the Test line, i.e. a reduction of 27%. It will be recalled that the only difference between the two reactor lines is the presence of growth medium support material in the Test line, with a volume fill factor of 20%.

Although at the present stage of the experiments the surprising results obtained by implementing the method of the invention cannot be formulated into a complete theory, it is possible however to provide several explanations.

Firstly, it should be noted that the observed differences between the results obtained on the Control and Test lines are clearly due to a different metabolism of the microorganisms when they are fixed to their support and set in motion by mechanical stirring and/or aeration:

it is clear that the fixed bacteria has a residence time in the reactor that is much longer than the free bacteria.

Consequently, the cell mortality is higher, resulting in a lower production of sludge. However, this factor cannot by itself justify a 27 to 40% lower sludge production as mentioned above;

the fixed microorganisms and the bacterial flock particles present in the culture medium of the biological reactor of the Test line undergo mechanical work due to the stirring and to the abrasion between the particulate materials, because of collisions between the particles. It is known that the fixed microorganisms are structured as a biofilm and the cohesion of this biofilm is provided by exopolymers synthesized by the bacteria. Large mechanical stresses contribute to the destruction of this structure; Maintaining a biological activity on the material therefore requires a continuous synthesis of exopolymers by the bacteria. As a result, the synthesis of these polymers becomes a more important metabolic pathway than the production of sludge. Since these exopolymers are either partially biodegradable, or soluble, they are involved in the abrasion mechanism in the liquid effluent.

A larger reduction in sludge for a greater sludge age, as FIGS. 3*a* and 3*b* show, may corroborate this second hypothesis insofar as the duration of the mechanical stress exerted on the biomass is longer.

Figure 4:
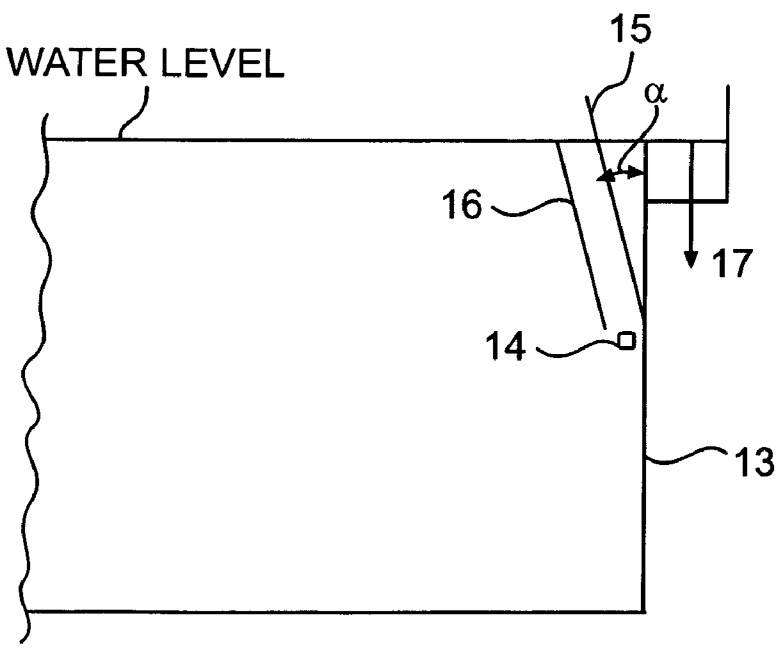
FIG. 4 is a schematic view showing the retention means employed in the reactor according to the invention.

It was seen above that the use of support materials for the growth of the microorganisms required particular means for retaining these materials in the biological reactor chamber. An embodiment of the retaining means thus employed will now be illustrated with reference to FIGS. 4 and 5.

Figure 5:
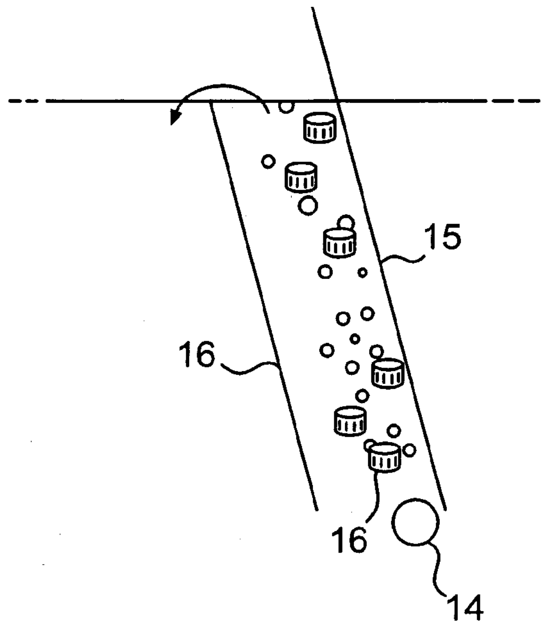
FIG. 5 is a view, on a larger scale, of a detail of FIG. 4.

These figures show that this retention device, which is placed in front of the chute 17 at the outlet of the reactor 13 for the treated effluent, essentially comprises a screen 15 inclined to the vertical of an angle $\alpha$ of preferably between 0 and 30°. The spacing of the bars of the screen is determined so as to let the water through, but not the microorganism support particles. The spacing of these bars is therefore less than the smallest dimension of the support particles used for immobilizing the microorganisms. A deflector panel 16 is placed parallel to the screen, upstream of the latter in the reactor 13. Provided at the base of the screen 15 is an air injection rail 14 for flushing the screen continuously or intermittently. The combined effect of this deflector panel 16 and of the flushing thus produced allows the ascending liquid flow to be channeled by an "air lift" effect that also entrains the particles of microorganism growth support materials 18 (FIG. 5). The flow thus created has two advantages:

firstly, the particles of support material help to clean the screen 15; and secondly, the high mechanical stresses exerted on the surface of the particles of support material in this region improve the sludge reduction effect observed experimentally and as mentioned above.

The treated liquid effluent discharged from the biological reactor, passing through the screen 15, is then removed by overflow by means of a spillway to the chute 17.

As regards the microorganism support elements, according to the present invention it is possible to use any existing material available commercially or able to be manufactured in accordance with the abovementioned characteristics. This material must therefore have the following characteristics:

one dimension, taken along any axis, of between 2 and 50 mm;

a particular surface texture, namely the presence of regions protected from abrasion (that allow the growth of a biomass, providing the biological activity) and abrasive regions that make it possible, in the presence of a high enough level of turbulence as defined above, to exert friction on the external surface of the other particles present in the reaction medium.

Thus, by taking into consideration the above-mentioned characteristics, a person skilled in the art will be able to select the types of materials suitable for the operation that has to be carried out. A few nonlimiting examples of materials that can thus be used are given below.

EXAMPLE 1

Particulate Material.

Figure 6:
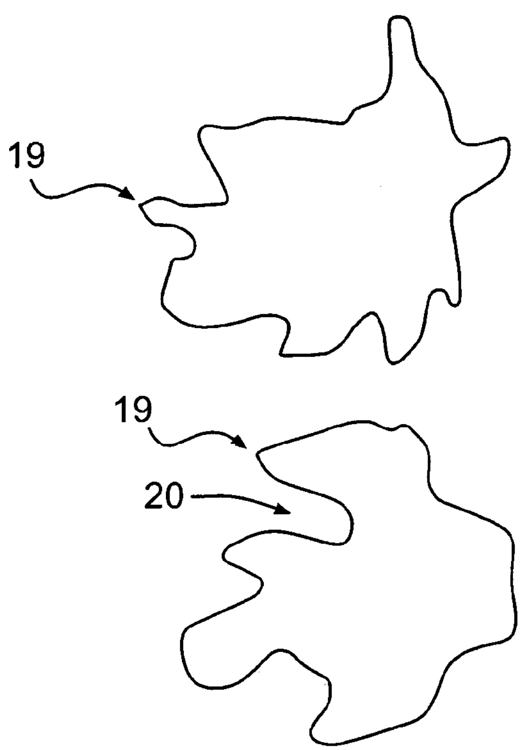
FIGS. 6, 7*a*, 7*b* and 8 show, schematically, examples of microorganism support materials that can be used in the method according to the invention.

Microorganisms support elements are formed from granular particles that can be obtained from the recycling of plastics, as described, for example in FR-A-2 612 085. FIG. 6 of the appended drawings illustrates an example of such particles that are in the form of granules having a very irregular shape, with recesses 20 protected from abrasion and protruding parts 19 that promote abrasion. The size of these granules is between 2 and 5 mm and their developed surface area may be between 5000 and 20 000 $m^2/m^3$.

EXAMPLE 2

Extruded Plastic.

Figure 7A:
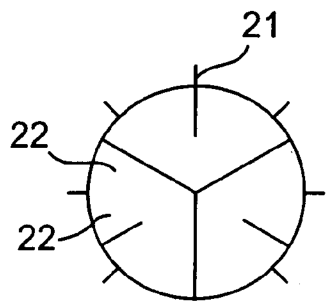
Figure 7B:
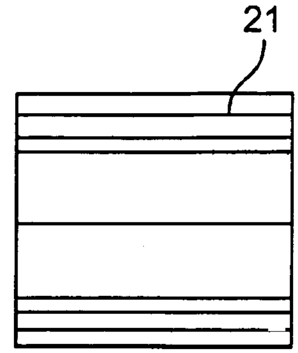

In this case, the microorganism support elements are formed from extruded and cut plastic materials. FIGS. 7*a* and 7*b* of the appended drawings show end and side views, respectively, of an illustrative example of such an element. This element is cylindrical in shape and has ribs 21, 22 provided on its external and internal surfaces respectively. The external ribs 21 allow the abrasion action to take place while the internal ribs 22 increase the surface area available for colonization of the biomass. The size of these support elements may be between 5 and 25 mm and their total developed surface area may be between 100 and 1500 $m^2/m^3$.

EXAMPLE 3

Compression-Molded Or Injection-Molded Plastic.

Figure 8:
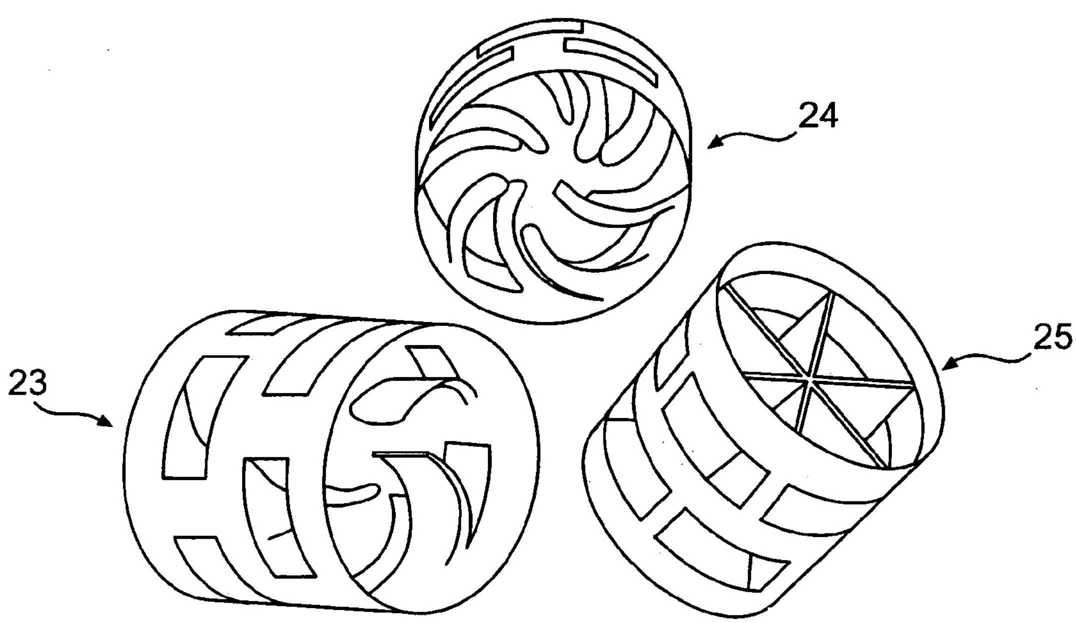

It is known that there are on the market many types of packing elements for columns having the required characteristics for taking advantage of the present invention. FIG. 8 of the appended drawings shows, in perspective, three illustrative examples of elements of this type. They are generally referred to as rings. Their size may be between 10 and 50 mm and their developed surface area may be between 100 and 1000 $m^2/m^3$. In the rings illustrated in FIG. 8, the abrasive surfaces may be the edges of the cylinders 24 and the recessed parts 23.

It will be noted that, with this type of material, which is characterized in particular by a larger size than the previous ones, the abrasion is also effected by the liquid flow through the internal regions. The rings include internal ribs 25 for colonization by the microorganisms.

Of course, it remains to be stated that the present invention is not limited to the illustrative examples described and shown above, rather it encompasses all variants thereof.

What is claimed is:

1. A biological reactor for implementing a method for the biological purification of wastewater in hybrid cultures employing microorganisms, at least same of which are fixed to solid support elements set in motion so as to generate turbulence in a reaction medium, the intensity of the turbulence being such that it reduces the production of biological sludge, the biological reactor including a microorganism support retention means positioned upstream of means for removing the liquid effluent leaving the reactor, the microorganism support means further comprising:

a screen inclined to the vertical at an angle of between 0 and 30 degrees;

wherein a predetermined separation of bars of the screen allow water through the screen but not the microorganism support particles;

an air injection rail positioned at the base of said screen and selectively operating continuously or intermittently so as to flush the screen; and a deflector panel located parallel to said screen and located upstream of the latter.

* * * * *